(12) United States Patent
Park

(10) Patent No.: US 8,798,485 B2
(45) Date of Patent: Aug. 5, 2014

(54) METHOD OF NOTIFYING STATUS INFORMATION AND IMAGE FORMING APPARATUS USING THE SAME

(75) Inventor: Seong-il Park, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 328 days.

(21) Appl. No.: 12/472,423

(22) Filed: May 27, 2009

(65) Prior Publication Data

US 2010/0070794 A1 Mar. 18, 2010

(30) Foreign Application Priority Data

Sep. 18, 2008 (KR) .................................. 2008-91667

(51) Int. Cl.
*G03G 15/00* (2006.01)
(52) U.S. Cl.
CPC ............ *G03G 15/55* (2013.01); *G03G 15/5016* (2013.01); *G03G 15/5075* (2013.01); *G03G 15/70* (2013.01)
USPC .............. 399/9; 399/8; 399/81; 714/E11.025; 714/E11.187
(58) Field of Classification Search
CPC ........................... G03G 15/5016; G03G 15/70
USPC ............... 399/8, 9, 13, 18, 21, 24, 27, 38, 81; 709/206; 714/48, E11.023, E11.025, 714/E11.184, E11.187

See application file for complete search history.

(56) References Cited

U.S. PATENT DOCUMENTS

| 5,414,494 | A  | * | 5/1995  | Aikens et al. ..................... 399/1 |
| 5,673,390 | A  | * | 9/1997  | Mueller ........................... 714/57 |
| 6,425,006 | B1 | * | 7/2002  | Chari et al. .................... 709/224 |
| 6,628,311 | B1 | * | 9/2003  | Fang ............................. 715/777 |
| 2004/0002782 | A1 | * | 1/2004  | Champion et al. .............. 700/94 |
| 2005/0193070 | A1 | * | 9/2005  | Brown et al. ................. 709/206 |
| 2005/0254850 | A1 | * | 11/2005 | Bardolatzy et al. ............. 399/81 |

FOREIGN PATENT DOCUMENTS

| JP | 2006-163984 | 6/2006 |
| KR | 2000-20698  | 4/2000 |

* cited by examiner

*Primary Examiner* — Benjamin Schmitt
(74) *Attorney, Agent, or Firm* — Stanzione & Kim, LLP

(57) ABSTRACT

A method of notifying status information and an image forming apparatus using the same. The method of notifying status information includes setting a display attribute of status information of the image forming apparatus, if status information of the image forming apparatus is updated, generating status notification information in a first format or a second format according to whether a display attribute is set for the updated status information, and transmitting the generated status notification information. Accordingly, a user is notified of error occurrence in a manner as he/she wishes.

23 Claims, 8 Drawing Sheets

| STATUS INFORMATION LIST | PRIORITY |
|---|---|
| ☑ Toner Low | Minor ▽ |
| ☑ Paper Jam 1 | Critical ▽ |
| ☑ Scanner Locked | Critical ▽ |
| ☐ ***** | ▽ |
| ☐ Memory Full | Major ▽ |

RESTORE TO INITIAL VALUE

FIG. 3

| STATUS INFORMATION LIST | PRIORITY |
| --- | --- |
| ☑ Toner Low | Minor ▽ |
| ☑ Paper Jam 1 | Critical ▽ |
| ☑ Scanner Locked | Critical ▽ |
| ☐ ***** | ▽ |
| ☐ Memory Full | Major ▽ |

RESTORE TO INITIAL VALUE

FIG. 5

| (DeviceStatus_DoorOpen | A | RDSAIS_critical |
|---|---|---|
| (DeviceStatus_Tray2DoorOpen | A | RDSAIS_critical |
| (DeviceStatus_FinisherDoorOpen | A | RDSAIS_critical |
| (DeviceStatus_FuserDoorOpen | A | RDSAIS_critical |
| (DeviceStatus_StaplerDoorOpen | B | RDSAIS_Warning |
| (DeviceStatus_CommFaultIOTtoFinisher | A | RDSAIS_critical |
| (DeviceStatus_IOTSerialInvalid | A | RDSAIS_critical |
| (DeviceStatus_EmbededFaxMismatch | A | RDSAIS_critical |
| (DeviceStatus_IOTRequireOSOK | A | RDSAIS_critical |
| (DeviceStatus_UserOSOK | B | RDSAIS_Warning |
| (DeviceStatus_OptionSIMInvalid | B | RDSAIS_Warning |
| (DeviceStatus_Tray1ElevatingErr | B | RDSAIS_Warning |
| (DeviceStatus_Tray2ElevatingErr | B | RDSAIS_Warning |

FIG. 6

[Notice/Urgent] CLX6200FX-DEVICE INFORMATION

Device Name             : CLX-6200FX
Admin Information       : park@samsung.com

| Error List | State | ServiceLinks |
|---|---|---|
| DeviceStatus_DoorOpen | Normal | A1000 |
| DeviceStatus_Tray2DoorOpen | Normal | A1000 |
| DeviceStatus_FinisherDoorOpen | Normal | A1000 |
| DeviceStatus_FuserDoorOpen | Opened(Critical) | A1003 |
| DeviceStatus_StaplerDoorOpen | Opened(Warning) | A1004 |
| DeviceStatus_CommFaultIOTtoFinisher | Normal | A1005 |
| DeviceStatus_IOTSerialInvalid | Normal | A1006 |
| DeviceStatus_EmbededFaxMismatch | Normal | A1007 |
| DeviceStatus_IOTRequireOSOK | Normal | A1008 |
| DeviceStatus_UserOSOK | Normal | A1009 |
| DeviceStatus_OptionSIMInvalid | Normal | A1010 |
| DeviceStatus_Tray1ElevatingErr | Normal | A1011 |
| DeviceStatus_Tray2ElevatingErr | Normal | A1012 |

FIG. 7

Title: Email notification system - A1720

The life of the paper transfer belt is approximately 50,000 black and color pages. After the life span of the paper transfer belt is complete, you have to replace it.
More information contact to link:
Device Status_TransferBeltWornOut : A1720

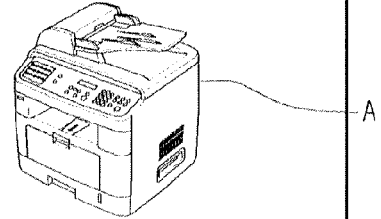
-A

<Machine Information>
Host Name:SEC0015991DC2CD
HostLocation:
Administrator Name:test
Administrator Telephone Number:111
Administrator Location:111
Administrator E-mail Address:kim@samsung.com
IP Address:010.088.197.103
Mono Page Count:22
Color Page Count:547
Scanned Page Count:185

[General Information]
OS version:1.00.00.986c3
Engine version:0.31.09
Serial number:7799-08040253731
PCL5e version:PCL5Ce5.43 03-28-2008
PCLXL version:PCL6 5.76 04-01-2008
PS version:PS3 V1.37.07 03-24-2008
QPDL version:SPL-C 5.35 11-20-2007

Signature by Admin

METHOD OF NOTIFYING STATUS INFORMATION AND IMAGE FORMING APPARATUS USING THE SAME

CROSS-REFERENCE TO RELATED APPLICATIONS

This application claims priority under 35 U.S.C. §119 (a) from Korean Patent Application No. 10-2008-91667, filed on Sep. 18, 2008, in the Korean Intellectual Property Office, the disclosure of which is incorporated herein by reference in its entirety.

BACKGROUND

1. Field of the Invention

The present general inventive concept relates to a method of notifying status information and an image forming apparatus using the same, and more particularly, to a method of notifying status information of an image forming apparatus in a format set by a user, and an image forming apparatus using the same.

2. Description of the Related Art

A network printer generally provides an emailing function. The emailing function of the network printer may be used to notify a user (or administrator) of status information if there is change in the status information of the printer.

A general process of notifying status information uses an emailing function of a conventional network printer as follows: If there is change in status information, a network printer generates text information to notify a user of the status information and emails the generated text information. Then, the user (or administrator) learns that there has been a change in the status information through the email transmitted from the printer.

For example, if a door of the printer is left in an open state, the printer can notify the user (or administrator) of this state since the printer cannot be normally operated in an open state. For example, the printer can transmit an email containing a text, such as "DOOR OPEN" to the user (or administrator).

If the user (or administrator) receives the email, the user can confirm that there has been a change in status information through a simple text contained in the email, and can take proper measures if necessary. For example, if an error occurs causing a printing procedure to fail, the error can be immediately solved.

However, if a simple error such as "DOOR OPEN" occurs, the error can be easily solved, but, if a complicated error occurs, it can be difficult for the user to know the complexity level of the error and also devise a solution to the error. Also, the user can make an additional effort to solve the problem, for example, by looking into extra documentation.

SUMMARY OF THE INVENTION

The present general inventive concept provides a method of notifying status information of an image forming apparatus in a defined format according to the settings of a user if the status information of the image forming apparatus is updated, and an image forming apparatus using the same.

Additional aspects and utilities of the present general inventive concept will be set forth in part in the description which follows and, in part, will be obvious from the description, or may be learned by practice of the general inventive concept.

Embodiments of the present general inventive concept may be achieved by providing a method of notifying status information of an image forming apparatus, wherein the method may include setting a display attribute of status information of the image forming apparatus. Further, if status information of the image forming apparatus is updated, then generating status notification information in a first format or a second format according to whether the display attribute is set for the updated status information, and transmitting the generated status notification information.

The method may further include setting a priority of the status information, wherein the setting of a display attribute includes setting a display attribute according to a set priority.

The display attribute may include a font size and a font color in which the status information is displayed.

Generating status notification information may include generating status notification information in the first format if a display attribute is set for the updated status information, and generating status notification information in the second format if a display attribute is not set for the updated status information.

The method of notifying status information of an image forming apparatus may further include setting whether to provide an alarm for the status information, wherein generating status notification information includes generating status notification information if status information, which is set to provide an alarm, is updated.

The first format may be to generate the status notification information according to the set display attribute, and the second format may be to generate the status notification information according to a default display attribute.

The transmitting of generated status notification information may include transmitting the generated status notification information via a pre-set email.

The status information may include error information, wherein while generating the status notification information, the status notification information can include at least one of error solving information to solve an error and link information related to the error solving information.

Embodiments of the present general inventive concept may further be achieved by providing an image forming apparatus, including a user interface to receive a display attribute of status information of the image forming apparatus, if status information of the image forming apparatus is updated, a status notification information generator to generate status notification information in a first format or a second format according to whether the display attribute is set for the updated status information, and a network interface to transmit the generated status notification information.

The user interface may further receive a priority of the status information, and may receive determination as to the display attribute for each priority.

The display attribute may include a font size and a font color in which the status information is displayed.

The status notification information generator may generate status notification information in the first format if the display attribute is set for the updated status information, and generate status notification information in the second format if the display attribute is not set for the updated status information.

The user interface may further provide a setting as to whether to provide an alarm for each status information, wherein the status notification information generator generates the status notification information if status information, which is set to provide an alarm, is updated.

The first format may generate status notification information according to the set display attribute, and the second format may generate the status notification information according to a default display attribute.

The network interface may transmit the generated status notification information via a pre-set email.

The status information may include error information, wherein the status notification information generator generates the status notification information, which can include at least one of error solving information to solve an error and link information related to the error solving information.

Embodiments of the present general inventive concept also provide a method of alerting status information of a peripheral device comprising: defining a priority to at least one status information alert; setting a display attribute to the priority; producing the status information alert incident to reaching a status of the peripheral device pertaining to the status information alert; and transmitting the alert.

Embodiments of the present general inventive concept also provide a peripheral device comprising: a display to receive a user-defined priority and display attribute of status information of the peripheral device; a status information alert generator to generate status information alerts of various configurations based in part upon on whether the display attribute is set to provide an alarm of status information to the display; and a network interface to transmit the generated status information alerts.

BRIEF DESCRIPTION OF THE DRAWINGS

These and/or other features and utilities of the present general inventive concept will become more apparent and more readily appreciated from the following description of the exemplary embodiments, taken in conjunction with the accompanying drawings, in which:

FIG. 3 is a view illustrating a priority setting user interface (UI) according an exemplary embodiment of the present general inventive concept;

FIG. 5 is a view illustrating default error state information according to an exemplary embodiment of the present general inventive concept;

FIG. 6 is a view illustrating status notification information according to an exemplary embodiment of the present general inventive concept;

FIG. 7 is a view illustrating an example of an email received by a user according to an exemplary embodiment of the present general inventive concept.

DETAILED DESCRIPTION OF THE PREFERRED EMBODIMENTS

Figure 1:
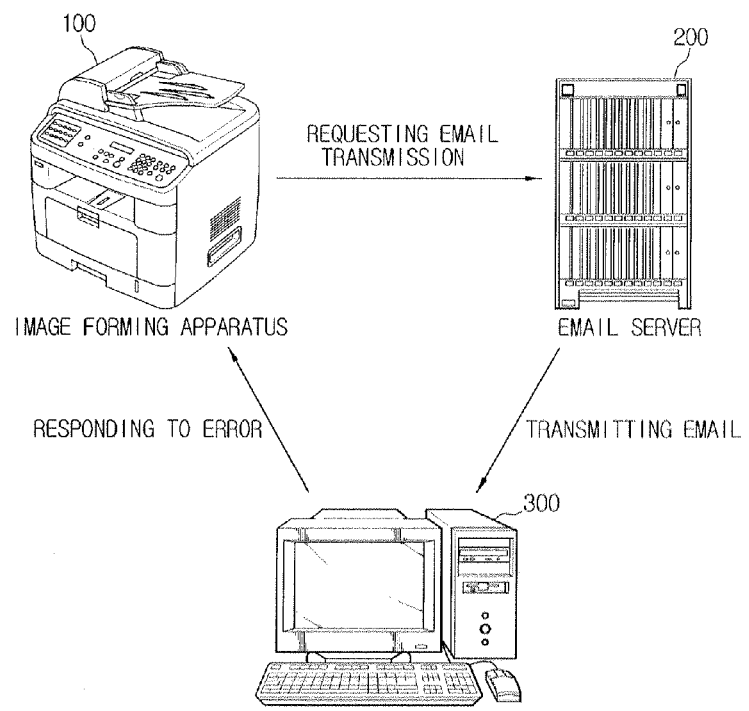
FIG. 1 is a diagram illustrating a system of notifying status information according to an exemplary embodiment of the present general inventive concept.

Reference will now be made in detail to exemplary embodiments of the present general inventive concept, with reference to the accompanying drawings, wherein like reference numerals refer to the like elements throughout.

FIG. 1 is a diagram illustrating a system of notifying status information according to an exemplary embodiment of the present general inventive concept.

Referring to FIG. 1, the system of notifying status information includes an image forming apparatus 100, an email server 200, and a user terminal device 300.

The image forming apparatus 100 is a network printer or a multi-function peripheral which has an emailing function. Although a single image forming apparatus 100 is illustrated as a part of the system of notifying status information for the convenience of explanation, a plurality of image forming apparatuses 100 may be connected to one another via a network.

The image forming apparatus 100 is able to update status information by various factors. The status information includes all functions of the image forming apparatus 100 and status information about the functions. Also, the status information can include error information such as "door open," "paper jam," "out of paper," and "toner low." The error may be an error which may not affect operation of the image forming apparatus 100 directly even if the error is not promptly cleared or, on the other hand, the error may be an error which may cause operation of the image forming apparatus 100 to fail unless the error is promptly cleared.

If the status information is updated, the image forming apparatus 100 can create an email containing status notification information to notify that the status information is updated, and can request the email server 200 to email. The image forming apparatus 100 will be described below in detail.

If the email server 200 is requested by the image forming apparatus 100 to transmit the email, the email server 200 can transmit the email containing the status notification information from the image forming apparatus 100 to an email address of a general user or an administrator.

The user terminal device 300 can serve on a terminal device used by a general user or an administrator. The general user or the administrator can check the email transmitted from the email server 200 using the user terminal device 300. Although a single user terminal device 300 is illustrated as a part of the system of notifying status information for the convenience of explanation, a plurality of user terminal devices 300 may be connected to one another via a network.

Figure 2:
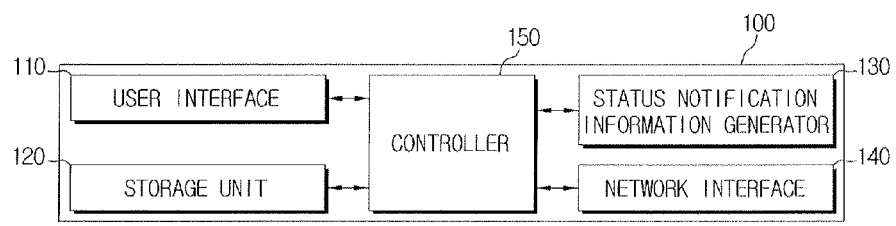
FIG. 2 is a block diagram illustrating an image forming apparatus according to an exemplary embodiment of the present general inventive concept.

FIG. 2 is a block diagram illustrating an image forming apparatus according to an exemplary embodiment of the present general inventive concept.

Referring to FIG. 2, the image forming apparatus 100 includes a user interface 110, a storage unit 120, a status notification information generator 130, a network interface 140, and a controller 150.

The user interface 110 can support an interface between a user and the image forming apparatus 100. In this embodiment, the user may include a general user and an administrator. The user interface 110 can receive user's determination as to a priority of status information, a display attribute of status information, and whether to set an alarm of status information.

The priority of status information is set through the user interface 110 to allow the user to respond to status information in a different way depending on a priority of the status information. For example, the user may select one of "Critical," "Major," and "Minor" for the priority of status information.

The user is also able to determine whether to receive notification of updates of status information if the status information is updated, by determining whether to set an alarm of status information to the user interface 110.

Also, the user is able to select a display attribute in which status information is displayed through the user interface 110, and the display attributes may include a font size and a font color.

The user interface 110 may provide a priority setting user interface (UI) upon receiving a signal requesting setting of a priority of status information. The priority setting UI can receive a user's determination as to priority for each status information item and whether to set an alarm of status information. Also, the user interface 110 may provide a display attribute setting UI upon receiving a signal requesting setting of a display attribute of status information.

The priority setting UI and the display attribute setting UI may be provided to the user through a display window (not shown) of the image forming apparatus 100 or the user terminal device 300. The priority setting UI and the display attribute setting UI will be described below in detail with reference to FIGS. 3 and 4.

The storage unit 120 can store status information set as initial data, i.e., default status information. The default status information can be generated and stored at the time of manufacturing the image forming apparatus 100, and may include a status information list and a status information attribute.

If status information stored in the storage unit 120 is error information, the storage unit 120 may store error solving information and link information related to the error solving information. The error solving information may be text information describing how to solve an error, or video information showing how to solve an error in a still picture or a moving picture.

Also, the storage unit 120 can store an email address of the user and update the user's email address occasionally. The storage unit 120 may store all of user's email addresses that can be linked to a network. This storage of email addresses is to notify not only a manger but also a general user of an error occurrence if there is change in the status information of the image forming apparatus 100.

The status notification information generator 130 can generate status notification information according to whether a display attribute is set for status information if the status information is updated. More specifically, the status notification information generator 130 can generate status notification information in a first format if a display attribute is set for updated status information, and can generate status notification information in a second format if a display attribute is not set for updated status information.

The first format can generate status information according to a display attribute set through the user interface 110, and the second format can generate status information according to a default display attribute. The status notification information generator 130 may generate status notification information of the first format with hypertext markup language (HTML) or extensible markup language (XML) data. The default display attribute can display status information with a general text, for example, with an intermediate size and a black font.

The status notification information generator 130 can generate status notification information in the first format or second format so as to display all of status information items stored in the storage unit 120 or some of status information items.

In generating the status notification information in the first format to display all of the status information items, the status notification information generator 130 can generate status notification information to display updated status information and un-updated status information in different display attributes.

In generating the status notification information in the second format, the status notification information generator 130 can generate status notification information to display status information in the same display attribute regardless of whether all of the status information items are displayed or some of the status information items are displayed.

The status notification information generator 130 may briefly display the status information if status notification information is generated to display all of the status information items. For example, rather than directly displaying information such as error solving information, the status notification information may display link information related to the error solving information. In this case, the user can receive status notification information containing all of the status information items via email, thereby easily learning of a current status of the image forming apparatus 100.

If the status notification information generator 130 generates status notification information displaying some of the status information items, the status notification information generator 130 can extract only updated status information and generate status notification information containing only the extracted status information. In this case, the user may receive only updated status information, thereby avoiding confusion that the user might have if unnecessary information is extracted.

The status notification information generator 130 may generate status notification information which is transmitted differently to a general user versus an administrator. The first and the second formats are applicable to this case.

Status notification information for a general user can contain only error type information, whereas status notification information for an administrator can include error solving information or link information to solve an error besides the error type information.

The reason why the status notification information may be transmitted differently to a general user versus an administrator is that the general user does not need to receive error solving information because the user should only refer to this information when using the image forming apparatus, whereas the administrator may need the error solving information because the user should solve the error of the image forming apparatus to allow the general users to smoothly use the image forming apparatus 100.

The status notification information generator 130 may generate status notification information to contain only status information which is set to provide an alarm. That is, if status information of the image forming apparatus 100 is updated but the updated status information is not set to provide an alarm, it is not necessary to notify that the status information is updated and so the status notification information generator 130 does not generate the status information.

As described above, the status notification information can be displayed in several manners but is not limited to the manners described herein. For example, the status notification information for transmitting an email is displayed in various manners.

The network interface 140 can support a network connection of the image forming apparatus 100. The image forming apparatus 100 may be connected to the email server 200 and the user terminal device 300 via the network interface 140. The network interface 140 can be controlled by the controller 150 to transmit an email containing status notification information to the email server 200 and request the email server 200 to transmit the email.

The controller 150 can control an entire operation of the image forming apparatus 100. That is, the controller 150 can control input and output of signals among the user interface 110, the storage unit 120, the status notification information generator 130, and the network interface 140.

The controller 150 can determine whether status information of the image forming apparatus 100 is updated or not, and if the status information is updated, the controller 150 can control the status notification information generator 130 to generate status notification information.

Then, the controller 150 can control the network interface 140 to transmit an email containing the status notification information and to request the email server 200 to transmit the email. The controller can extract a corresponding email address from the storage unit 120 in creating an email.

In creating an email to transmit status notification information, the controller 150 may control the email to be transmitted only to an administrator of all of the users who are connected to the network or only to a user who stops printing due to error. Also, the controller 150 may control the email to be transmitted to all of the users who are connected to the network. In this case, since all of the users are able to know when an error occurs with the image forming apparatus 100, the users can avoid using the image forming apparatus 100 where error occurs.

FIG. 3 is a view illustrating a priority setting UI according to an exemplary embodiment of the present general inventive concept.

If a signal requesting setting of a priority is input by a user, the user interface 100 can provide a priority setting UI as shown in FIG. 3. The priority setting UI can display menus entitled "status information list" of which items are selected using respective check boxes and "priority" is selected using a drop down list.

The user can select whether to set an alarm on each status information item using the menu "status information list," and can assign each status information item priority as, "Critical," "Major," or "Minor" using the "priority" menu.

For example, since error "Toner Low" does not cause the printing operation to fail even if the error is not promptly cleared, the status information item of "toner low" can be assigned "Minor."

However, since error "Paper Jam" causes the printing operation to fail if the error is not promptly cleared, the status information item of "Paper Jam" can be assigned "Critical."

Also, the priority setting UI can be provided with a "Restore To Initial Value" button. If the button "Restore to Initial Value" is used, status information which has been updated several times by a user is restored to default status information. For this, the storage unit 120 can store default status information.

Figure 4:
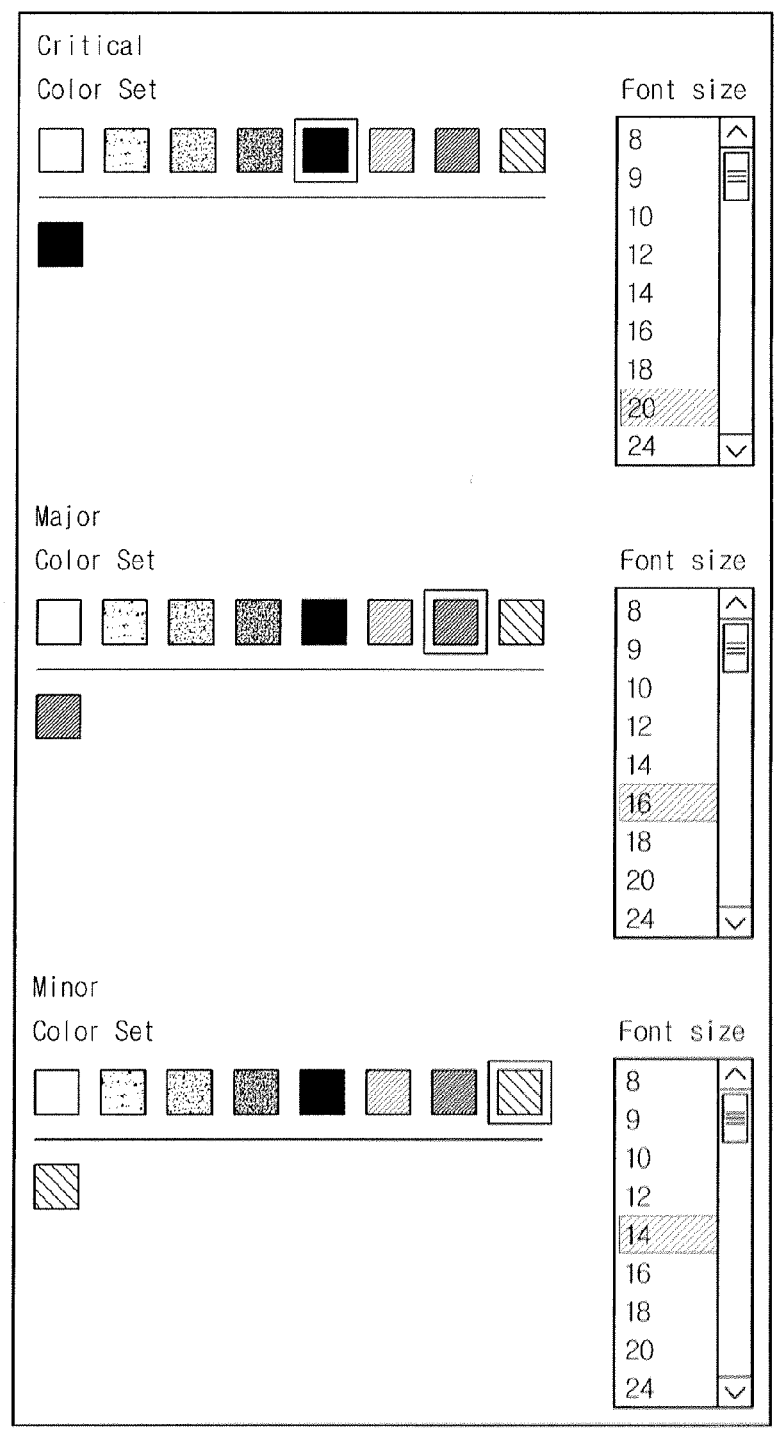
FIG. 4 is a view illustrating a display attribute setting UI according to an exemplary embodiment of the present general inventive concept.

FIG. 4 is a view illustrating a display attribute setting UI according to an exemplary embodiment of the present general inventive concept.

The user interface 110 can provide a display attribute setting UI as shown in FIG. 4 if a signal requesting setting of a display attribute of status information is input by a user.

As shown in FIG. 4, the display attribute setting UI may includes a menu "Color Set" to select a font color for each priority, and a menu "Font Size" to select a font size.

Using the display attribute setting UI, the user is able to select the color and size of a font in which status information assigned a priority of "Critical," "Major," or "Minor" is displayed.

For example, the status information assigned "Critical" is set with a red font to be distinguished from other status information, and the status information assigned "Major" or "Minor" is set with colors other than the red since its priority is lower than the "Critical." Also, the higher the priority, the larger the font size may be selected.

As described above, the user is able to select a display attribute of the status information displayed on an email as he/she wishes using the display attribute setting UI shown in FIG. 4. If the user does not set the display attribute of the status information, a default display attribute may be used.

The priority setting UI of FIG. 3 and the display attribute setting UI of FIG. 4 are merely examples of UIs to receive setting data from a user, and are not limited to the setting data illustrated in FIGS. 3 and 4. Menus and types included in the priority setting UI and the display attribute setting UI are variable.

Also, in this embodiment, colors and sizes of the fonts can be set to be different depending on priorities. However, the status information may be displayed differently depending on priorities by adopting forms supported by HTML or XML.

FIG. 5 is a view illustrating default status information according to an exemplary embodiment of the present general inventive concept.

The default status information can contain a list of status information, information on whether an alarm is set, and priority information stored in the storage unit 120 in the form of a table. If the user sets an alarm and priority differently from initial data using the priority setting UI, the default status information is updated with the data set by the user.

FIG. 6 is a view illustrating status notification information according to an exemplary embodiment of the present general inventive concept.

In FIG. 6, the status notification information contains all of the status information items, controlled by the controller 150. The status notification information may include device names, administrator information, an error list, error state, and service links of error solving information.

As shown in FIG. 6, items "DeviceStatus_FuserDoorOpen" and "DeviceStatus_StaplerDoorOpen" indicating that errors occurred are displayed in larger and different color font. Also, as a hyperlink is set in the link information which is linked to error solving information of the error items, the user is able to refer the link information to obtain error solving information.

FIG. 6 illustrates status notification information containing all of the status information items, and displaying link information linked to error solving information of each error. However, error solving information describing how to solve an error may be directly displayed for each error. More specifically, error solving information can be displayed on an email if status notification information contains only updated status information, i.e. only information indicating an error which actually occurs.

FIG. 7 is an example of an email received by a user according to an exemplary embodiment of the present general inventive concept.

The user may receive an email illustrated in FIG. 7 by way of an example. The email can contain a title and a body. The body can include status notification information containing error types and error solving information, and additional information such as "Machine Information" and "General Information."

The status notification information may further contain image information "A" relating to the image forming apparatus 100 to allow the user to easily discriminate an apparatus where an error occurs. The image information "A" may indicate an exterior of the image forming apparatus 100 and a location where image forming apparatus is installed. The image information "A" is useful if a plurality of image forming apparatuses 100 are connected to a network.

Figure 8:
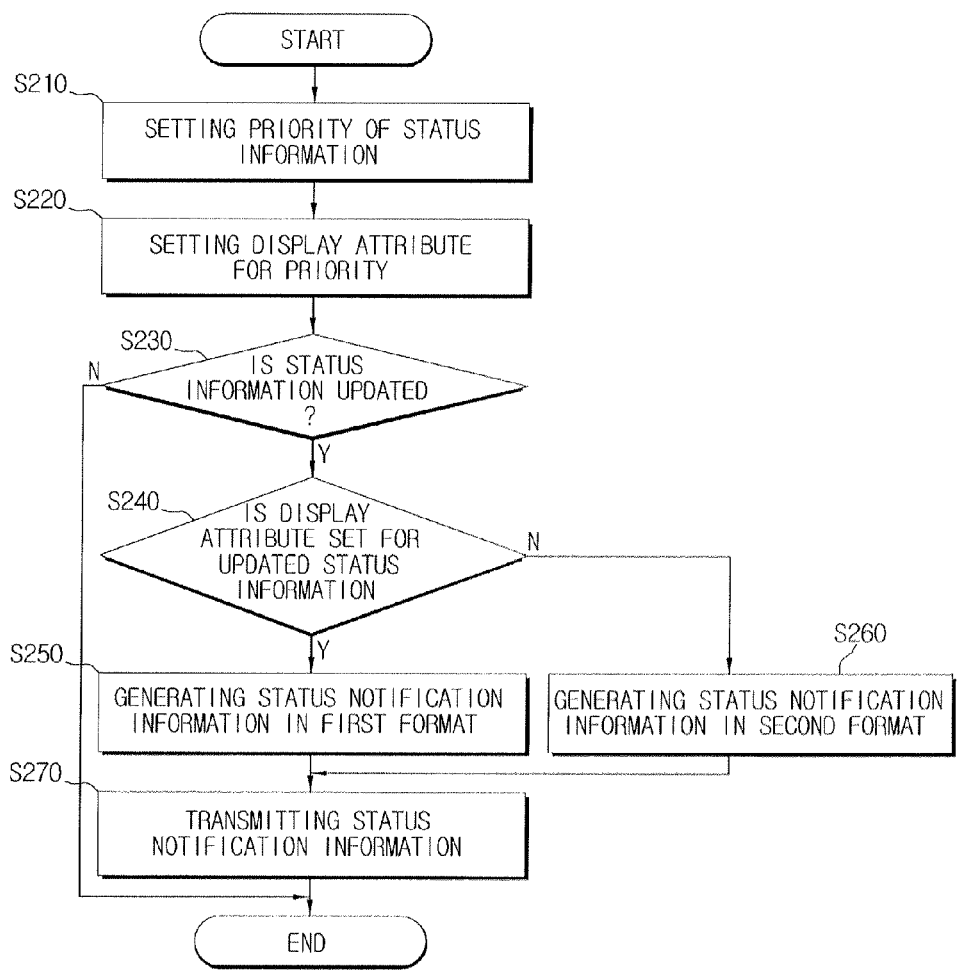
FIG. 8 is a flowchart illustrating a method of notifying status information according to an exemplary embodiment of the present general inventive concept.

FIG. 8 is a flowchart illustrating a method of notifying status information according to an exemplary embodiment of the general present inventive concept.

If a signal is applied from a user to request setting of a priority, the user interface 110 can provide the priority setting UI. The user can assign a priority to status information using the priority setting UI in operation S210.

If the priority of status information is set through the priority setting UI, the user interface 110 can provide a display attribute setting UI to receive selection of a display attribute for each priority in operation S220.

After that, the controller 150 can determine whether status information of the image forming apparatus 100 is updated or not, in operation S230. If the status information is updated in operation S230-Y, then it is determined whether a display attribute is set for the updated status information in operation S240.

If a display attribute is set for the updated status information in operation S240-Y, then the status notification information generator 130 may generate status notification information in the first format in operation S250. If a display attribute is not set for the status information in operation S240-N, then the status notification information generator 130 may generate status notification information in the second format in operation S260.

If the status notification information is generated in the first format or the second format by the status notification information generator 130, then the network interface 140 can be controlled by the controller 150 to transmit an email containing the status notification information in operation S270.

Through the above procedure, the email can be transmitted to the user. The user can check the email transmitted from the image forming apparatus 100 using the user terminal device 300, and learns that the status information of the image forming apparatus is updated and also learns which type of an error occurs in the image forming apparatus and how to solve the error.

Although exemplary embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of notifying status information of an image forming apparatus, the method comprising:
setting a display attribute to correspond to status information of the image forming apparatus based on a user's selection of the display attribute;
setting a user-selected priority of the display attribute from among a plurality of user-selectable priorities;
generating status notification information in at least one of a first data format and a second data format according to whether the display attribute and the user-selected priority are set corresponding to an updated status information; and
sending a notification about the generated status notification information based on the user-selected priority to display the generated status notification information along with the user-selected priority, such that the notification is sent to one of an administrator and a general user based on the user-selected priority.

2. The method of claim 1, further comprising:
setting a priority of the status information,
wherein the setting of the display attribute comprises setting the display attribute according to the set priority.

3. The method of claim 1, wherein the display attribute comprises:
a font size and a font color in which the status information is displayed.

4. The method of claim 1, wherein the generating status notification information comprises;
generating status notification information in the first data format if a display attribute is set for the updated status information, and generating status notification information in the second data format if the display attribute is not set for the updated status information.

5. The method of claim 1, further comprising;
setting whether to provide an alarm for the status information,
wherein generating status notification information comprises generating status notification information if status information, which is set to provide an alarm, is updated.

6. The method of claim 1, wherein the first data format is to generate the status notification information according to the set display attribute, and the second data format is to generate the status notification information according to a default display attribute.

7. The method of claim 1, wherein notifying the generated status notification comprises:
transmitting the generated status notification information via a pre-set email or displaying the generated status notification information via a user interface.

8. The method of claim 1, wherein the status information comprise:
error information,
wherein, in the generating the status notification information, the status notification information comprises at least one of error solving information to solve an error and link information related to the error solving information.

9. An image forming apparatus comprising:
a user interface to receive an input and to generate a selection signal to allow a user to select and set a display attribute to correspond to status information of the image forming apparatus and to set a user-selected priority of the display attribute from among a plurality of user-selectable priorities;
a status notification information generator to generate status notification information in at least one of a first data format and a second data format according to whether the display attribute and the user-selected priority are set corresponding to an updated status information;
a network interface to send a notification about the generated status notification information based on the user-selected priority to display the generated status notification information along with the user-selected priority, such that the notification is sent to one of an administrator and a general user based on the user-selected priority.

10. The image forming apparatus of claim 9, wherein the user interface further receives a priority of the status information, and receives selection of the display attribute for each priority.

11. The image forming apparatus of claim 9, wherein the display attribute comprises:
a font size and a font color in which the status information is displayed.

12. The image forming apparatus of claim 9, wherein the status notification information generator generates status notification information in the first data format if the display attribute is set for the updated status information, and generates status notification information in the second data format if the display attribute is not set for the updated status information.

13. The image forming apparatus of claim 9, wherein the user interface further receives a setting as to whether to provide an alarm for each status information,
wherein the status notification information generator generates the status notification information if status information, which is set to provide an alarm, is updated.

14. The image forming apparatus of claim 9, wherein the first format is to generate status notification information according to the set display attribute, and the second format is to generate the status notification information according to a default display attribute.

15. The image forming apparatus of claim 9, further comprising:
a display unit,
wherein the network interface notifies the generated status notification by transmitting information via a pre-set email, or the display unit notifies the generated status notification information by displaying.

16. The image forming apparatus of claim 9, wherein the status information comprises:
error information,
wherein the status notification information generator generates the status notification information which comprises at least one of error solving information to solve an error and link information related to the error solving information.

17. A method of alerting status information of a peripheral device comprising:
selecting a display attribute corresponding to the status information of the image forming apparatus;
generating the status notification information in at least one of a first data format and a second data format according to whether the display attribute is set corresponding to an updated status information;
setting a user-selected priority from among a plurality of user-selectable priorities to at least one status information alert via an input unit of the peripheral device;
setting a display attribute corresponding to the priority via the input unit based on a user's selection of the display attribute;
producing the status information alert in response to reaching a status of the peripheral device pertaining to the status information alert; and
sending a notification about the status information alert when the status information alert corresponds to the defined user-selected priority to display the notification along with the user-selected priority, such that the notification is sent to one of an administrator and a general user based on the user-selected priority.

18. A peripheral device comprising:
a display to receive an input and to generate a selection signal to allow a user to select and set a user-defined priority corresponding to status information of the peripheral device from among a plurality of user-definable priorities and to allow a user to select and set a display attribute corresponding to status information of the peripheral device;
a status information alert generator to generate status information alerts of various configurations in at least one of a first data format and a second data format based on whether the display attribute is set to provide an alarm of status information to the display as well as whether the user-defined priority is set corresponding to an updated status information; and
a network interface to send a notification about the generated status information alerts based on the user-defined priority to display the notification along with the user-selected priority, such that the notification is sent to one of an administrator and a general user based on the user-selected priority.

19. An image forming apparatus comprising:
a display to receive an input and to generate a selection signal to allow a user to select and set a user-defined priority corresponding to status information of the image forming apparatus from among a plurality of user-definable priorities and to allow a user to select and set a display attribute corresponding to status information of the image forming apparatus;
a control module to determine a status change of the image forming apparatus;
a status notification information generator to generate the status notification information indicating an error in one of a first data format including at least one hyperlink corresponding to the error and a second data format different from the first data format and excluding a hyperlink based on a display attribute setting and the user-defined priority setting of the image forming apparatus corresponding to the status change; and
a network interface to send a notification about the generated status notification information indicating the error of the image forming apparatus to a device located remotely from the image forming apparatus based on the user-defined priority to display the generated status notification information along with the user-selected priority, such that the notification is sent to one of an administrator and a general user based on the user-selected priority.

20. The image forming apparatus of claim 19, wherein error solving information to resolve the error is displayed in response to selecting the hyperlink.

21. A peripheral device, comprising:
an input unit to receive an input, to generate a selection signal to allow a user to select and set a user-defined priority corresponding to status information of the peripheral device from among a plurality of user-definable priorities, to allow a user to select and set a display attribute corresponding to status information of the peripheral device, and to assign a priority among the plurality of user-definable priorities to at least one status information alert, and to allow a user to select and set a display attribute corresponding to the priority;
a status notification information generator to generate the status notification information alert in at least one of a first data format and a second data format according to whether the display attribute and the user-defined priority are set;
a display unit to display the status information alert according to the at least one of the first data format and the second data format in response to reaching a status of the peripheral device pertaining to the status information alert incident; and
a network interface to send a notification about the status information alert and the display attribute when the status information alert incident corresponds to the user-defined priority to display the notification along with the user-selected priority, such that the notification is sent to one of an administrator and a general user based on the user-selected priority.

22. An image forming apparatus, comprising:
a user interface to allow a user to select and set a display attribute to correspond to a user-selected priority level of status information of the image forming apparatus from among a plurality of user-selectable priorities;

a status notification information generator to generate status notification information in response to the status information being updated, such that the generated status notification information corresponds to the selected display attribute if the display attribute is set by the user as well as the user-selected priority; and a network interface to send a notification to the user about the generated status notification information based on the user-selected priority to display the notification along with the user-selected priority, such that the notification is sent to one of an administrator and a general user based on the user-selected priority.

23. The image forming apparatus of claim 22, wherein the status notification information generator generates a default status notification information if the display attribute is not set by the user.

* * * * *